(12) United States Patent
Hall

(10) Patent No.: US 6,941,941 B1
(45) Date of Patent: Sep. 13, 2005

(54) COOKING APPARATUS

(75) Inventor: Kenneth Michael Hall, Johannesburg (ZA)

(73) Assignee: Cobb International Limited, Pretoria (ZA)

( * ) Notice: Subject to any disclaimer, the term of this patent is extended or adjusted under 35 U.S.C. 154(b) by 0 days.

(21) Appl. No.: 10/089,247

(22) PCT Filed: Sep. 28, 2000

(86) PCT No.: PCT/IB00/01384

§ 371 (c)(1),
(2), (4) Date: Jul. 29, 2002

(87) PCT Pub. No.: WO01/22854

PCT Pub. Date: Apr. 5, 2001

(30) Foreign Application Priority Data

Sep. 28, 1999 (ZA) .................................... 99/6164
Dec. 22, 1999 (ZA) .................................... 99/7827

(51) Int. Cl.[7] .............................................. F24B 3/00
(52) U.S. Cl. .................................... 126/25 R; 126/26
(58) Field of Search .......................... 126/25 R, 39 R, 126/41 R, 26

(56) References Cited

U.S. PATENT DOCUMENTS

| | | | | |
|---|---|---|---|---|
| 2,161,669 A | * | 6/1939 | Freeman .................... | 126/25 R |
| 3,306,280 A | * | 2/1967 | Vannoy ..................... | 126/25 R |
| 3,322,060 A | * | 5/1967 | Gilbert ...................... | 99/421 R |
| 3,455,233 A | * | 7/1969 | Cable ........................ | 99/443 R |
| 3,487,199 A | * | 12/1969 | Hamlin ....................... | 219/399 |
| 3,581,731 A | * | 6/1971 | Schulze ..................... | 126/25 R |
| 3,606,066 A | * | 9/1971 | Anderson ................... | 126/25 R |
| 3,667,446 A | * | 6/1972 | Morton ........................ | 126/9 R |
| 3,683,791 A | * | 8/1972 | Rast, Jr. ....................... | 99/340 |
| 3,857,380 A | * | 12/1974 | Hansman ................... | 126/25 A |
| 3,868,943 A | * | 3/1975 | Hottenroth et al. ........ | 126/25 R |
| 3,982,522 A | * | 9/1976 | Hottenroth et al. ............ | 126/2 |
| 4,582,041 A | * | 4/1986 | Erickson ...................... | 126/9 R |
| 4,635,612 A | * | 1/1987 | Kakubari et al. .......... | 126/25 R |
| 4,884,551 A | * | 12/1989 | Hait ............................ | 126/9 R |
| 5,197,379 A | | 3/1993 | Leonard, Jr. | |
| 5,261,386 A | * | 11/1993 | Burkhart .................... | 126/25 R |
| 5,406,930 A | | 4/1995 | Ragland et al. | |
| 5,588,420 A | | 12/1996 | Dickson | |
| 5,797,386 A | * | 8/1998 | Orr ........................... | 126/25 R |
| 6,349,713 B1 | * | 2/2002 | Toyama ....................... | 126/26 |

FOREIGN PATENT DOCUMENTS

WO     WO 00/02474     1/2000

* cited by examiner

Primary Examiner—Carl D. Price
(74) Attorney, Agent, or Firm—The Webb Law Firm

(57) ABSTRACT

A cooking apparatus is provided which includes a base and a closure member. The base includes insulating material which at least partially defines a combustion chamber for holding a combustible material for providing heat in use. The closure member is arranged to be seated on the base and at least partially defines a cooking chamber heated by the combustible material. The base typically includes an upper section and a lower section with an air inlet defined between the sections to allow air flow into the combustion chamber. The apparatus includes a body portion which includes an elongate air inlet for feeding air to the combustion chamber in use, the inlet being defined between the upper and lower sections.

20 Claims, 7 Drawing Sheets

COOKING APPARATUS

BACKGROUND OF THE INVENTION

1. Field of the Invention

THIS INVENTION relates to cooking apparatus. It also relates to a base for cooking apparatus.

2. Description of the Related Art

Various different types of outdoor cooking apparatus including a base and a dome are well known. The base and the dome define a hemispherical body including a cooking chamber in which a combustible material, e.g. charcoal briquettes or the like, provide heat to cook food in a barbecue fashion. A typical example of such apparatus is a Weber™ kettle barbecue which has a metal base and dome. In use, the metal of the dome and base heats up resulting in reduced efficiency and hindering portability of the apparatus in use. For the purposes of this specification apparatus in the form of a so-called "kettle barbecue" should be predominantly, but not exclusively, borne in mind.

SUMMARY OF THE INVENTION

According to the invention, there is provided cooking apparatus which includes
- a base including insulating material which at least partially defines a combustion chamber for holding a combustible material for providing heat in use; and
- a closure member arranged to be seated on the base, the closure member at least partially defining a cooking chamber heated by the combustible material.

Typically, the base includes an upper section and a lower section with an air inlet defined between the sections to allow air flow into the combustion chamber.

Further in accordance with the invention, there is provided cooking apparatus which includes a body portion including
- a base including an upper section and a lower section, the upper section defining a combustion chamber for holding a combustible material for providing heat in use, and the lower section being attached to the upper section;
- an elongate air inlet for feeding air to the combustion chamber in use, the inlet being defined between the upper and lower sections; and
- a closure member arranged to be seated on the base, the closure member at least partially defining a cooking chamber heated by the combustible material.

Still further in accordance with the invention, there is provided cooking apparatus which includes a body portion including
- a base which defines a combustion chamber for holding a combustible material for providing heat in use; and
- a closure member arranged to be seated on the base, the closure member at least partially defining a cooking chamber heated by the combustible material and including an inner surface which enhances reflection of heat.

The reflective surface is typically defined by a natural inner metal surface of the closure member and, accordingly, the inner surface of the closure member is preferably not painted or provided with a finish which reduces reflection of heat.

The base typically includes insulating material which at least partially defines the combustion chamber for holding the combustible material to provide heat in use. The combustion chamber may include holding means for holding the combustible material. Typically, the holding means is in the form of a metal dish which is seated in a bottom opening of the insulating material. The dish may be circular in outline and include a lower circular ring section in which a plurality of apertures are defined. In use, the air from the air inlet passes through the apertures to allow combustion of the combustible material.

The base typically includes a frame within which the insulating material is mounted and which forms part of the upper section. Preferably, the frame is a hollow circular cylindrical frame and, accordingly, the lower section may be circular in lateral section and attached to an operatively lower end of the frame. The air inlet port may thus be circular in outline.

The lower section may be shaped and dimensioned so as at least partially to define an air reservoir below the combustion chamber. Typically, the lower section of the base includes a lower frame, e.g. a pressed metal frame, and insulating material for insulating the lower section from heat radiating from the holding means. The air reservoir may be defined between the insulating material in the lower and upper sections and the holding means. In a preferred embodiment, the lower section includes a glass fibre mat provided on an upper surface of the insulating material in the lower section. Accordingly, the combustion chamber may be a generally insulated chamber with an open upper end from which heat radiates into the cooking chamber.

The upper section of the base may include a heat reflective insert which defines a seat in which the holding means is seated and which also defines a wall of the combustion chamber. The insulating material may be shaped and dimensioned to receive the reflective insert and insulate the reflective insert from the frame. The reflective insert is typically pressed and its upper rim defines a seat for the closure member. The closure member is typically in the form of a dome, e.g. a pressed anodised aluminium dome which is about 1 mm thick, and which includes a plurality of ventilation apertures and a handle. In certain embodiments, the dome is metallic powder coated on its exterior.

The insulating material is typically glass fibre wool, ceramic wool, a perlite ceramic mix, a vermiculite cement mix, or the like.

The cooking apparatus may include a metal grille or grid which is located in use between the combustion chamber and the cooking chamber. Typically, the grille is in the form of a stainless steel disc which is circular in outline and includes a substantial number of apertures or bores. The grille is dimensioned so that it may be seated on the reflective insert and the bores are arranged in rings or groups at increasing radii. In certain embodiments, a plurality of grooves, typically three grooves arranged in a star, are provided. Advantageously, the bores have a diameter of about 5 mm thereby to inhibit any flame arising in the combustion chamber from entering the cooking chamber.

The invention extends to a base for cooking apparatus as hereinbefore described.

The invention is now described, by way of example, with reference to the accompanying diagrammatic drawings.

DETAILED DESCRIPTION OF THE PREFERRED EMBODIMENTS

Figure 1:
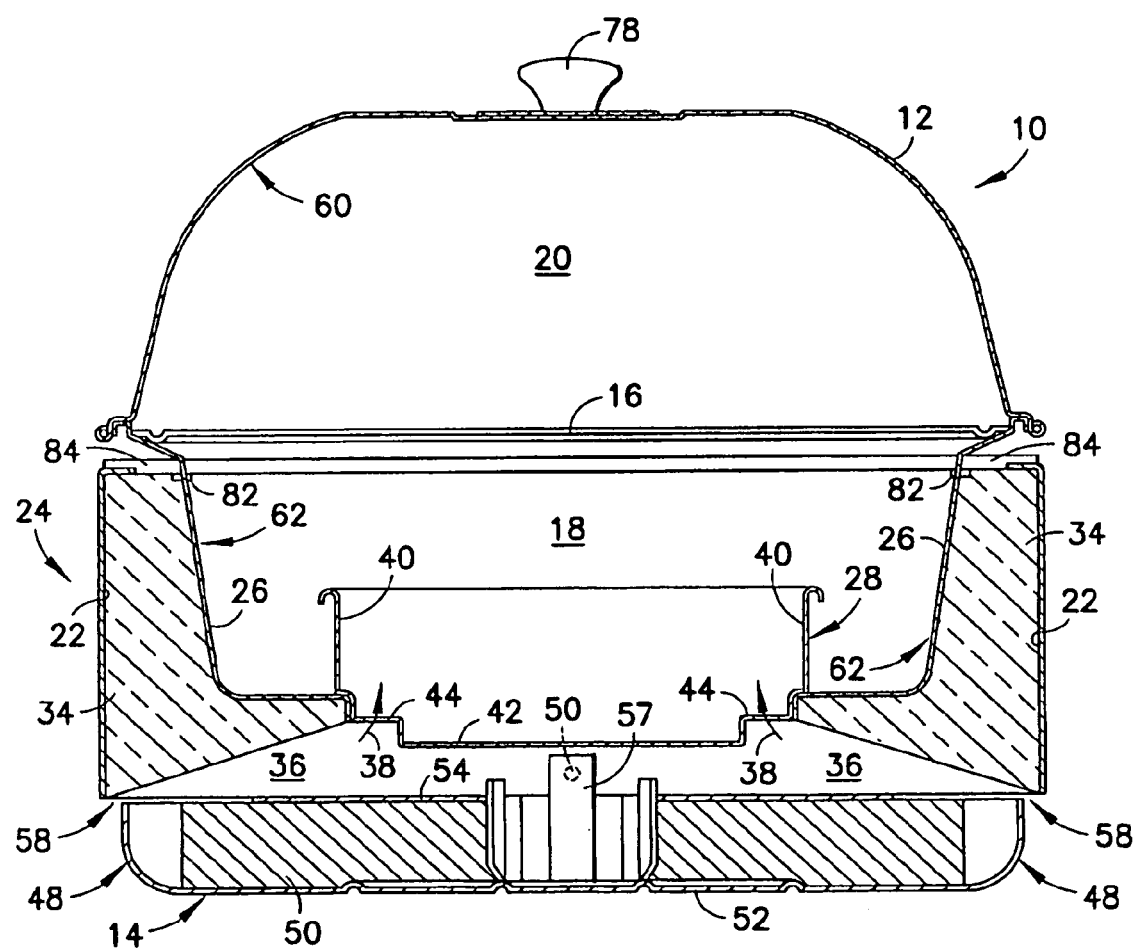
FIG. 1 shows a cross-sectional view of cooking apparatus in accordance with the invention.

Referring to the drawings, reference numeral 10 generally indicates cooking apparatus in accordance with the invention. The apparatus 10 is in the form of a so-called "kettle barbecue" and is typically used in an outdoor environment to cook food. The apparatus 10 includes a dome-shaped closure member or lid 12, a base 14, and a grille 16 which separates a combustion chamber 18 and a cooking chamber 20. As described in more detail below, a combustible material, typically charcoal briquettes or the like, is located in the base 14 to provide heat which rises into the cooking chamber 20 thereby to cook food located on the grille 16.

The base 14 includes an outer sleeve or frame 22 (see FIGS. 1, 7 and 8) which is typically of an ABS plastics material of about 2.5 mm in thickness. The frame 22 is hollow circular cylindrical and forms part of an upper section 24 of the base 14. It is however to be appreciated that the base may be of any shape. The base 14 further includes a heat reflective insert 26 (see FIGS. 1 and 2) which is generally cylindrical in outline with a tapering diameter and provides a seat in which holding means in the form of a dish 28 (see FIGS. 1, 2, 4 and 5) is seated. The dish 28 is typically of stainless steel with a diameter 30 (see FIG. 2) of about 170 mm and a depth 32 of about 35 mm.

In order to enhance heat retention within the combustion chamber 18 and inhibit heating of the frame 22, insulating material 34 is provided. The insulating material 34 is typically glass fibre wool, ceramic wool, a perlite cement mix, vermiculite cement mix, or the like and, in top plan view, is generally cylindrical in shape and defines a seat for the insert 26. The insulating material 34 is shaped and dimensioned so as to define an air reservoir 36 from which air may be drawn into the combustion chamber 18 as generally indicated by arrows 38. Accordingly, the dish 28 includes side walls 40 integrally formed with a bottom or base 42 via a circular ring 44 (see FIG. 4) with circumferentially spaced bores or apertures 46 (only a few of which are referenced in the drawings for clarity) to allow air flow as indicated by arrows 38.

The base 14 further includes a lower section 48 which is typically pressed from aluminium and of a slightly lesser diameter than the upper section 24. The lower section 48 includes a circular disc 50 of insulating material to insulate its lower frame 52 from heat radiated from the dish 28. Further, the lower section 48 includes a glass fibre film 54 to enhance the insulation. In other embodiments, the base 14 is of ABS plastics material.

Figure 2:
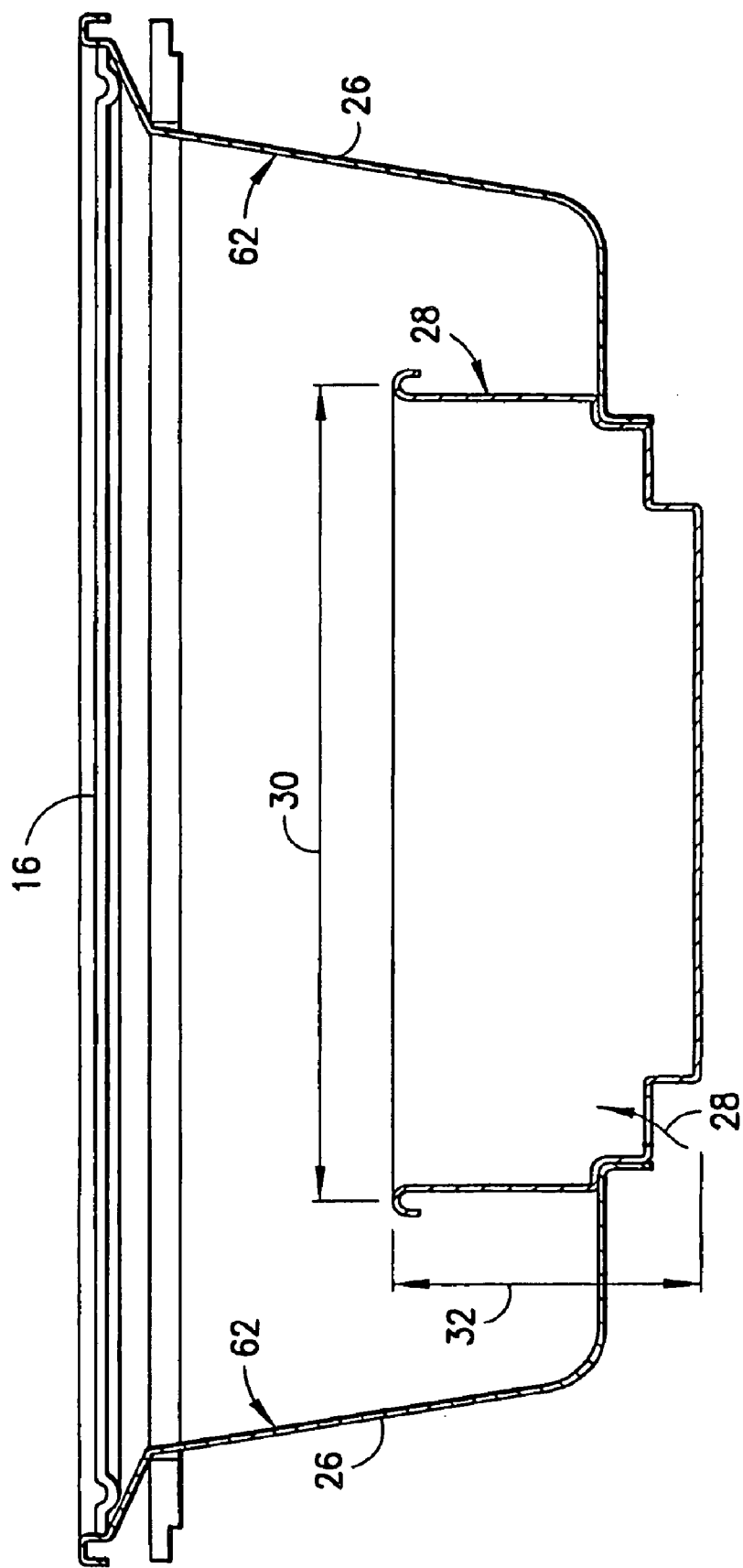
FIG. 2 shows a cross-sectional view of components of a base of the apparatus of FIG. 1.
Figure 8:
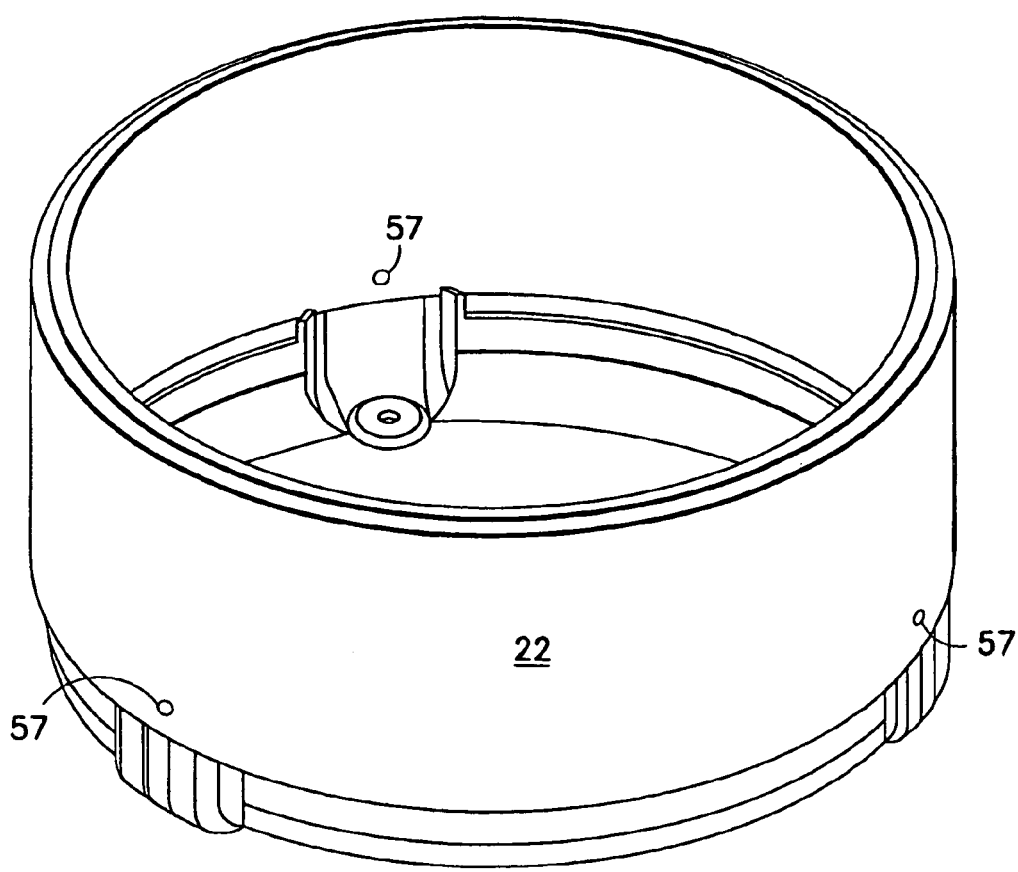
FIG. 8 shows a three-dimensional view from the top of a frame of the base of the apparatus.
Figure 9:
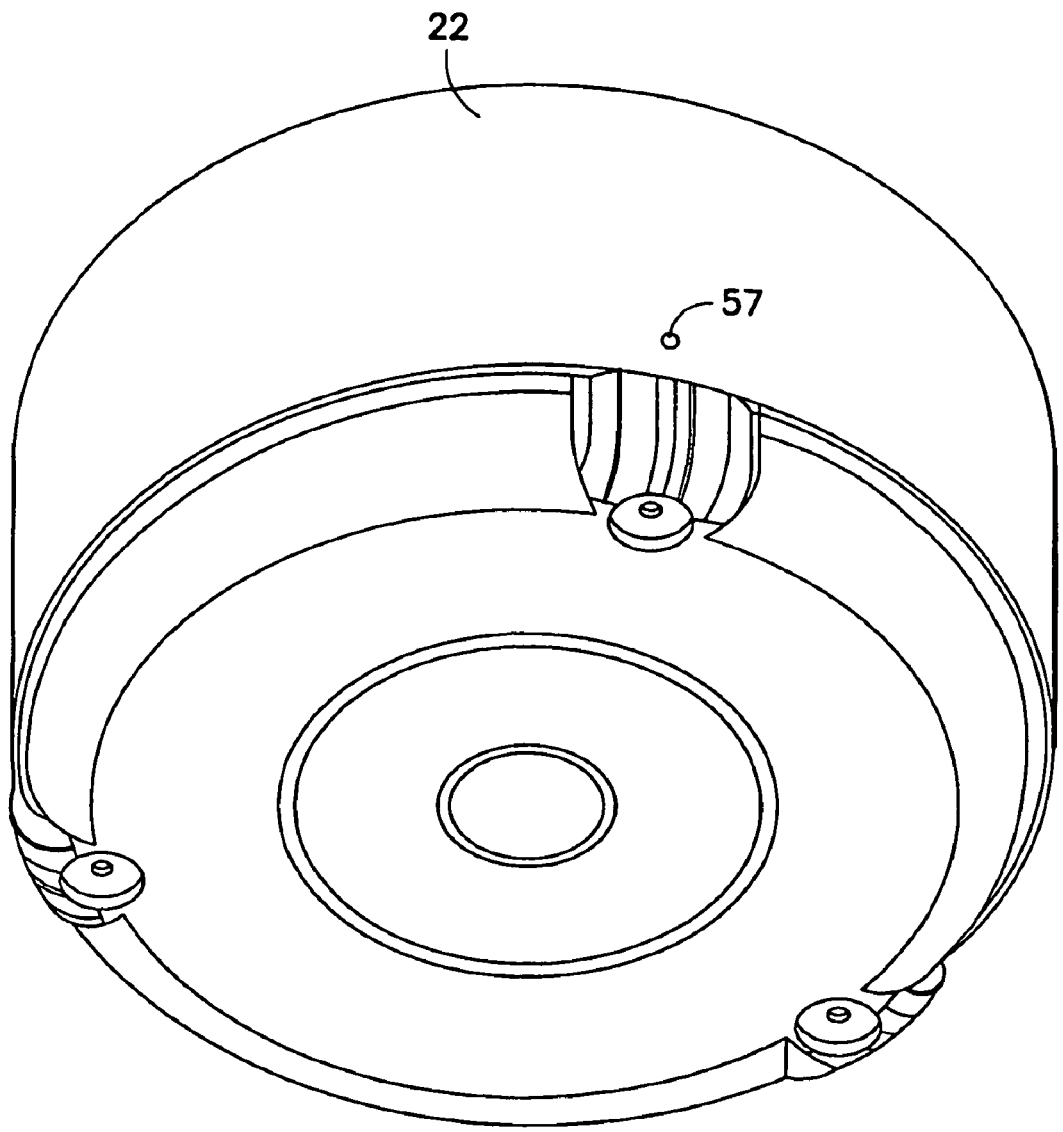
FIG. 9 shows a three-dimensional view from the bottom of the frame of FIG. 8.

The lower section 48 includes three equally angularly spaced mounting brackets 56 (only one of which is shown in FIG. 1) for mounting the lower section 48 to the upper section 24. The lower section 48 is mounted to the upper section 24 in such a fashion so as to define an annular air inlet 58 which allows air to be drawn into the combustion chamber 18 via the air reservoir 36 and through the bores 46. The air inlet 58 is in the form of a ring which extends about the upper and lower sections 24, 48 to allow a more uniform intake of air. As the air inlet 58 is elongate in nature and extends in the form of a ring it is believed that the effect of ambient wind on combustion in the combustion chamber 18 is at least partially reduced. Each mounting bracket 56 is pop-riveted (not shown) to the frame 22 through apertures 57 (see FIGS. 1, 8 and 9).

Figure 3:
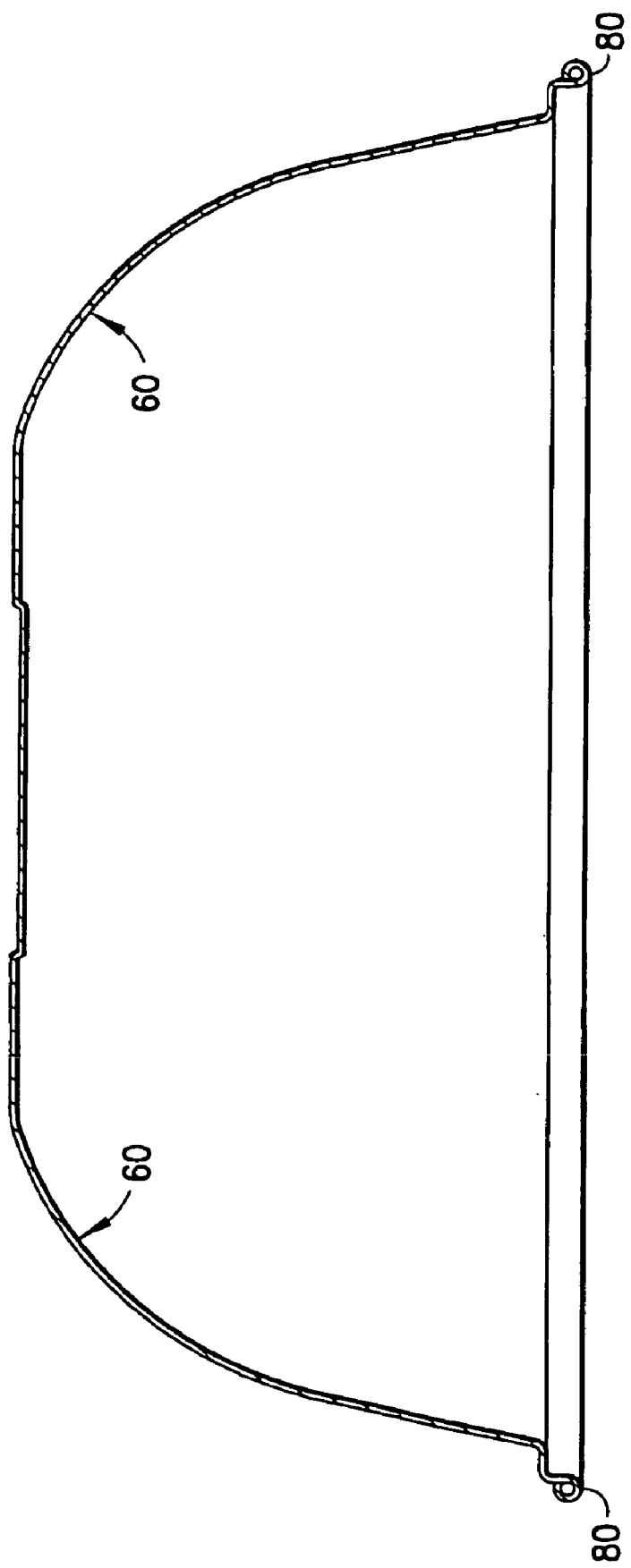
FIG. 3 shows a cross-sectional view of a closure member of the apparatus of FIG. 1.
Figure 4:
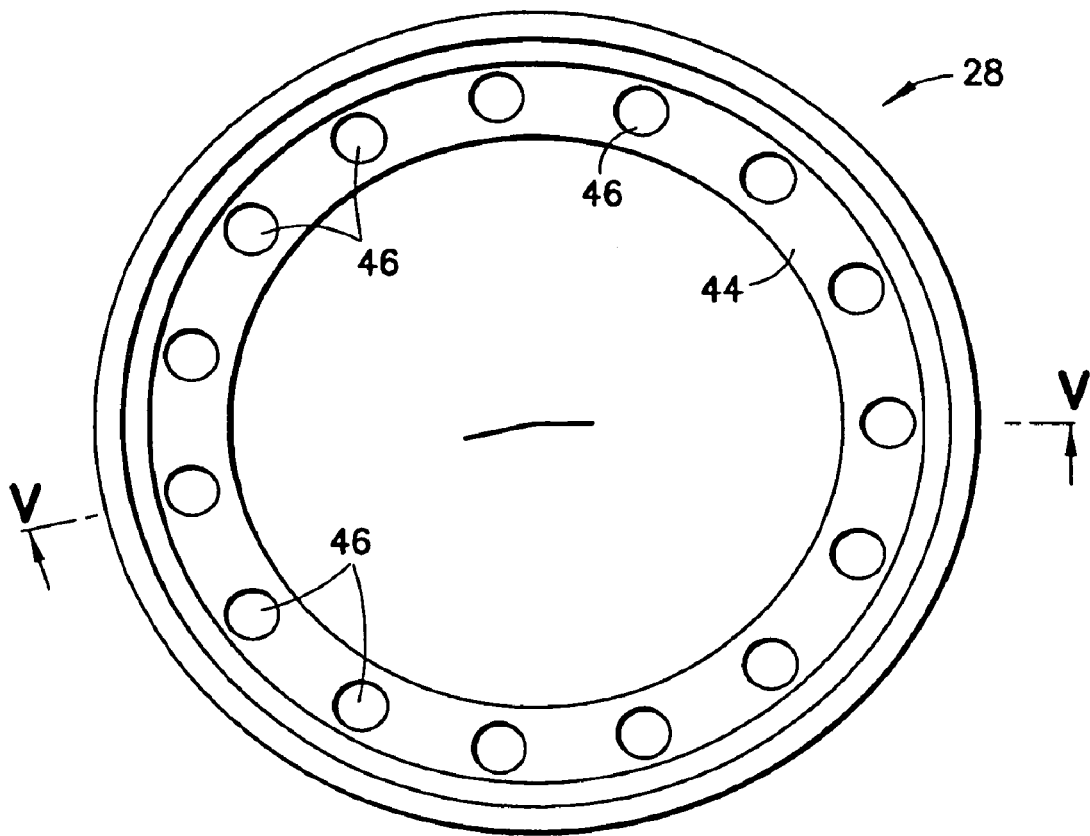
FIG. 4 shows a top plan view of holding means for holding a combustible material in a combustion chamber of the apparatus.
Figure 5:
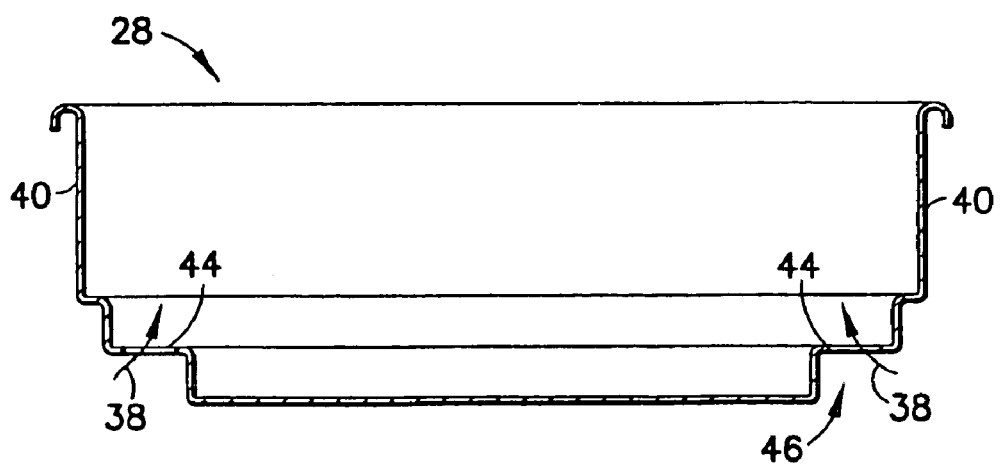
FIG. 5 shows a cross-sectional view of the holding means taken at V—V in FIG. 4.

The closure member or lid 12 is pressed from aluminium and has a natural internal reflective surface 60 (see FIGS. 1 and 3) which enhances the reflection of heat towards food located on the grille 16. Accordingly, the internal reflective surface 60 is not painted black or a dark colour which retards reflection. However, in certain embodiments, the lid 12 may include a coating which enhances reflection. Likewise, the insert 26 has a reflective surface 62 to enhance the reflection of heat towards the grille 16 and thus towards the cooking chamber 20.

Figure 6:
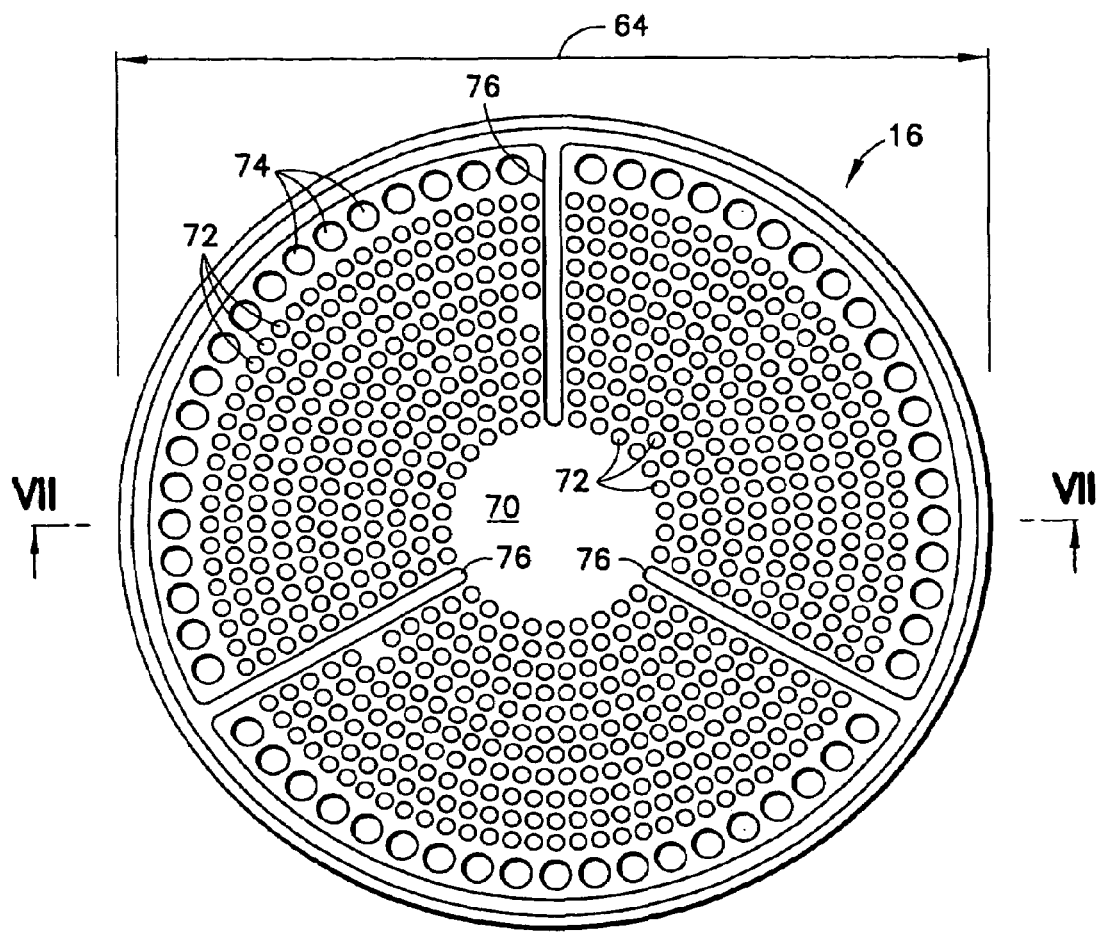
FIG. 6 shows a top plan view of a grille or platform of the apparatus of FIG. 1.
Figure 7:
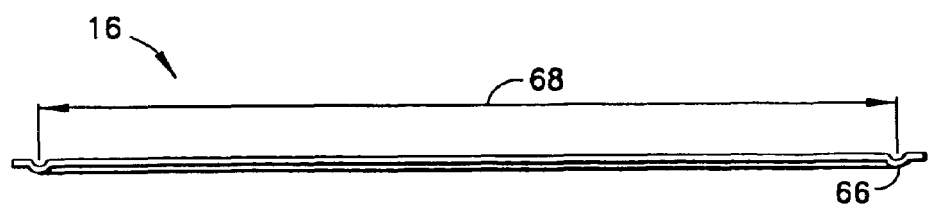
FIG. 7 shows a cross-sectional view of the grille taken at VII—VII in FIG. 6 with certain detail omitted for the sake of clarity.

Referring in particular to FIGS. 6 and 7 of the drawings, the grille 16 is disclike in shape and of stainless steel which is about 1 to about 1.5 mm thick. In a further embodiment, the grille 16 has three pressed feet which are spaced circumferentially equidistant. In use, the feet are seated on the insert 26. It is believed that in the event of the grille 16 buckling or warping due to heat, the grille 16 may rest in a stable fashion on the insert 26 by means of the feet.

The grille 16 has a diameter 64 of about 290 mm and a circumferential groove 66 with a diameter 68 of about 275 mm. Further, the grille 16 has a solid central portion 70 about which a substantial number of holes or bores 72 are formed. The bores 72 are arranged in an equally spaced fashion on circles of increasing radii. The bores 72 have a diameter of about 5 mm so that any flame occurring in the combustion chamber 18 is inhibited from entering the cooking chamber 20. A circle of bores 74 having a larger diameter is provided about a periphery of the grille 16. The grille 16 has recesses or grooves 76 which extend outwardly from the central portion 70 in a starlike fashion. In use, the bores 74 provide increased ventilation between the combustion chamber 18 and the cooking chamber 20 and the grooves 76 enhance the rigidity of the grille 16.

The closure member or lid 12 includes a handle 78 to facilitate removal thereof from the base 14. The lid 12 is typically anodized aluminium of about 1 mm in thickness and three ventilation holes (not shown) are provided about the handle 78. In other embodiments, the exterior of the lid 12 is metallic powder coated. The ventilation holes are typically about 15 mm in diameter and the handle 78 is typically of a suitable plastics material capable of withstanding high temperatures. As mentioned above, the lid 12 has an internal reflective surface 60 to reflect heat towards the grille 16. A lower peripheral edge 80 includes an upturned lip to facilitate seating of the lid 12 on the reflective insert 26 (see FIG. 1).

In order to retain the insert 26 in its seated position within the insulating material 34, pop-rivets 82 are provided (see FIG. 1). In particular, the base 14 includes a plastics ring 84 which is siliconed to the frame 22 and checks removal of the insert 26 as a result of the pop-rivets 82. In other embodiments, the pop-rivets 82 are omitted and the insert is retained in its seated position by means of a high temperature silicone adhesive.

It is believed that the invention, as illustrated, provides an enhanced cooking apparatus 10 for barbecuing. In particular, the insulating material 34 reduces the amount of heat lost from the combustion chamber 18 to the frame 22 thereby increasing the quantum of heat fed through to the cooking chamber 20. Further, as the frame 22 in insulated from the combustion chamber 18, it remains relatively cool during the cooking operation and, accordingly, the cooking apparatus 10 may be lifted or transported by user with relative ease.

It is further believed that the grille 16 which separates the cooking chamber 20 from the combustion chamber 18 enhances the operating characteristics of the apparatus 10. In particular, the bores 72 inhibit any flames which may be generated in the combustion chamber 18 from entering the cooking chamber 20 and, accordingly, the likelihood of the food being burnt by the flames is therefore reduced. Further, as the inlet 58 extends about the periphery of the base 14, it is believed that the flow of air into the cooking chamber 18 is less sensitive to ambient wind than in the case where a few large apertures are provided as in conventional barbecue cooking apparatus. In addition, the internal reflective surface 60 of the lid 12 enhances cooking as heat is reflected towards food placed on the grille 16.

What is claimed is:

1. A cooking apparatus including:
    a base with an interior combustion chamber therein, the combustion chamber having an inner side wall and an outer side wall spaced from one another to define an insulating zone containing insulating material, the combustion chamber including a dish for combustible material concentrically arranged within the combustion chamber and having side walls which are inwardly spaced from the inner side wall of the combustion chamber so that an upwardly directed open annular trough is defined between the side walls of the dish and the inner side wall of the combustion chamber; and
    wherein the base further includes an upper section and a lower section with an annular air inlet defined between the upper and lower sections to allow air flow into the combustion chamber, the upper section and lower section being spaced from one another, wherein a portion of the insulating material in the insulating zone and the lower section of the base defines an air reservoir in fluid communication with the air inlet.

2. The cooking apparatus according to claim 1, including a closure member arranged to be seated on the base, the closure member at least partially defining a cooking chamber heated by the combustible material and including an inner reflective surface which enhances reflection of heat.

3. The cooking apparatus as claimed in claim 1, in which the base includes insulating material within an interior of the lower section, wherein the insulating material in both the insulation zone and the lower section of the base insulates the upper and lower sections against heat radiating from the combustible material in the dish.

4. The cooking apparatus as claimed in claim 3, in which the reflective surface is defined by an inner metal surface of the closure member.

5. The cooking apparatus as claimed in claim 4, in which the insulating material in the base at least partially defines the combustion chamber for holding the combustible material.

6. The cooking apparatus as claimed in claim 5, in which the dish holds the combustible material.

7. The cooking apparatus as claimed in claim 6, in which the dish is made from metal and which is seated in a bottom opening of the insulating material in the upper section of the base.

8. The cooking apparatus as claimed in claim 7, in which the dish is circular in outline and includes a lower circular ring section in which a plurality of apertures is defined.

9. The cooking apparatus as claimed in claim 8, in which said outer side wall defines a frame within which insulating material is mounted and which forms part of the upper section of the base.

10. The cooking apparatus as claimed in claim 9, in which the frame is a hollow circular cylindrical shaped and the lower section is circular in lateral section and attached to an operatively lower end of the frame.

11. The cooking apparatus as claimed in claim 10, in which the lower section is shaped and dimensioned so as at least partially to define the air reservoir below the combustion chamber.

12. The cooking apparatus as claimed in claim 11, in which the lower section of the base includes a lower frame having insulating material for insulating the lower section from heat radiating from the dish.

13. The cooking apparatus as claimed in claim 12, in which the air reservoir is defined between the insulating material in the lower and upper sections and the dish.

14. The cooking apparatus as claimed in claim 13, in which the lower section includes a glass fibre mat provided on an upper surface of the insulating material in the lower section.

15. The cooking apparatus as claimed in claim 14, in which the upper section of the base includes a heat reflective insert which defines a seat in which the dish is seated and which also defines a wall of the combustion chamber.

16. The cooking apparatus as claimed in claim 15, in which the insulating material is shaped and dimensioned to receive the reflective insert and insulate the reflective insert from the frame.

17. The cooking apparatus as claimed in claim 16, in which the closure member is in the form of a dome and includes a plurality of ventilation apertures and a handle.

18. The cooking apparatus as claimed in claim 17, which includes a metal grille or grid which is located in use between the combustion chamber and the cooking chamber.

19. The cooking apparatus as claimed in claim 18, in which the grille is in the form of a stainless steel disc which is circular in outline and includes a substantial number of apertures or bores.

20. The cooking apparatus as claimed in claim 19, in which the grille is dimensioned so that it may be seated on the reflective insert and the bores are arranged in rings or groups having increasing radii.

\* \* \* \* \*